US00RE36978E

United States Patent [19]

Moscovitch

[11] E Patent Number: Re. 36,978

[45] Reissued Date of Patent: Dec. 5, 2000

[54] DUAL DISPLAY SYSTEM

[76] Inventor: Jerry Moscovitch, 59 Cowar Avenue, Toronto, Ontario, Canada, M6K 2N1

[21] Appl. No.: 09/172,193

[22] Filed: Oct. 13, 1998

Related U.S. Patent Documents

Reissue of:

[64] Patent No.: 5,687,939
Issued: Nov. 18, 1997
Appl. No.: 08/638,158
Filed: Apr. 26, 1996

[51] Int. Cl.[7] ..... F16M 11/00

[52] U.S. Cl. ..... 248/122.1; 248/921; D14/113

[58] Field of Search ..... 248/917, 919, 248/921, 122.1, 178.1, 185.1, 176.3, 920, 922; D14/113; 345/156

[56] References Cited

U.S. PATENT DOCUMENTS

| | | | |
|---|---|---|---|
| D. 278,820 | 5/1985 | Woodhall | D14/103 |
| D. 340,235 | 10/1993 | Robak et al. | D14/103 |
| 4,112,423 | 9/1978 | Bertolasi | 345/156 |
| 4,159,417 | 6/1979 | Rubincam . | |
| 5,467,102 | 11/1995 | Kuno et al. . | |
| 5,534,888 | 7/1996 | Lebby et al. . | |
| 5,673,170 | 9/1997 | Register . | |

*Primary Examiner*—Ramon O. Ramirez
*Attorney, Agent, or Firm*—Harness Dickey & Pierce, P.L.C.

[57] ABSTRACT

A display system includes a base, a pair of electronic displays, and an arm assembly that supports the displays from the base in vertical or horizontal registration. In one implementation, the arm assembly is a single telescopic member that rotates relative to the base and locks in vertical and horizontal orientations, the displays rotate relative to the member between corresponding extreme angular positions in which the operative angular orientation of the displays relative to horizontal is maintained, and the length of the member is adjusted to minimize separation of the displays. In another implementation, the arm assembly has separate arms rotating about vertically spaced axes and linked to minimize the separation of the displays automatically when vertically or horizontally registered. In a simple implementation, the arm assembly is a rigid arm that releasably attaches to the base only in vertical and horizontal orientations, the displays mounted releasably to the arm in pre-defined angular orientations that preserve their operative angular orientation, and one display can be connected to the arm at spaced apart position to adjust separation of the displays.

17 Claims, 9 Drawing Sheets

DUAL DISPLAY SYSTEM

Matter enclosed in heavy brackets [ ] appears in the original patent but forms no part of this reissue specification; matter printed in italics indicates the additions made by reissue.

FIELD OF THE INVENTION

The invention relates generally to electronic displays used with computers, and more particularly, to a display system permitting convenient positioning of dual displays.

BACKGROUND OF THE INVENTION

Computers are readily adapted to operate multiple displays. Paired monitors are useful when large amounts of related information, such as data or graphics, must be compared. Paired monitors can be inconvenient, however, where limited desk space is available. Also, in some instances information may be best presented with the monitors horizontally aligned, and in other instances, with the monitors vertically aligned. Conventional practices do not permit such selection or changing of monitor orientations.

SUMMARY OF THE INVENTION

In one aspect, the invention provides a display system comprising a base, a pair of electronic displays, and means for positioning the displays selectively in vertically registered relationship and in horizontally registered relationship. The positioning means comprise an arm assembly which supports the displays and which may comprise a single rotary arm, a pair of arms rotating about separate axes, a single arm locatable in two desired orientation or interchangeable arms of different length. The positioning means support the arm assembly from the base selectively in a first orientation relative to the base in which the displays are positioned in vertically registered relationship and in a second orientation in which the displays are positioned in a horizontally registered relationship. Each display has an operative angular orientation relative to horizontal (neglecting tilting which is normally permitted about a horizontal or vertical axis). For example, a landscape display is normally operated with its lengthwise axis oriented horizontal as the video board operating the display will normally align text or other displayed matter with the display's lengthwise axis. The positioning means thus include means for adjusting the angular orientation of each of the displays relative to the arm assembly to orient each display in its operative angular orientation when the arm assembly is in either of its orientations with the displays either vertically or horizontally registered.

In one implementation of the invention, the arm assembly rotates about a generally horizontal axis relative to the base, and each display rotates relative to the arm assembly. The arm assembly may be releasably locked in either of its pair of orientations, typically vertical or horizontal, and each display is permitted to rotate only between a pair of extreme angular positions relative to the arm assembly. Each extreme angular positions corresponds to a different orientation of the arm assembly relative to the base so that each display is oriented in its operative angular orientation whenever the arm assembly is locked to the base in either of the orientations and the display is rotated to its corresponding angular position. In another implementation, the arm assembly and the displays are coupled so that the angular orientation of each display relative to the arm assembly changes as the arm assembly displaces between its pair of orientations, ensuring that each display automatically orients in its operative angular orientation whenever the displays are vertically or horizontally registered.

The displays will often be horizontally elongate in their operative angular orientation. It will generally be desirable to minimize the spacing between edges of the displays whether vertically registered or horizontally registered. To that end, the center-to-center spacing between the displays is preferably reduced when the displaces are vertically registered and increased when the displays are horizontally registered. In one approach, the arm assembly may be a telescopic member that permits telescopic adjustment of display spacing. In another approach, one display may mounted to the arm assembly in different positions spaced apart along the arm. In a particularly robust arrangement, the one display has a plug that interlocks with either of a pair of sockets located proximate to one end of the arm assembly and spaced apart axially along the arm assembly.

In yet another implementation, the spacing between horizontally elongate displays is automatically adjusted as the arm assembly is displaced between orientations that place the displays in horizontal and vertical registration. The arm assembly comprises a pair of horizontally spaced apart arms rotating in parallel planes. Means supporting the arm assembly from the base comprise upper and lower rotary shafts in parallel relationship. One arm has its fixed end fixed to the upper shaft such that the arm rotates in a plane perpendicular to the upper shaft. The other arm has a fixed end fixed to the lower shaft such that the other arm rotates in a plane perpendicular to the lower shaft in response to rotation of the upper shaft. In their vertically registered relationship, a predetermined one of the displays is located below the other display. The one display (lower when vertically registered) is mounted to the free end of the one arm fixed to the upper shaft, and the other display (upper when vertically registered) is mounted to the free end of the other arm fixed to the lower shaft. Since one arm extends downwardly to support the lower display and the other arm extends upwardly to support the upper display, the center-to-center spacing between the displays is effectively reduced when registered. However, when the arms are rotated outwardly to position the displays in horizontal registration, the center-to-center spacing increases.

Various aspects of the invention will be apparent from a description below of a preferred embodiment and will be more specifically defined in the appended claims.

DESCRIPTION OF THE DRAWINGS

The invention will be better understood with reference to drawings in which.

DESCRIPTION OF PREFERRED EMBODIMENTS

Figure 1:
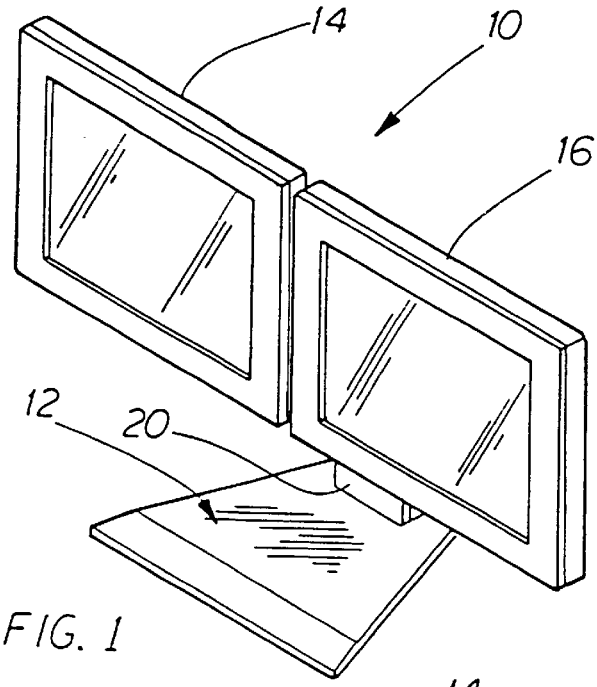
FIGS. 1–6 illustrate a first display system with dual displays in various orientations.
Figure 2:
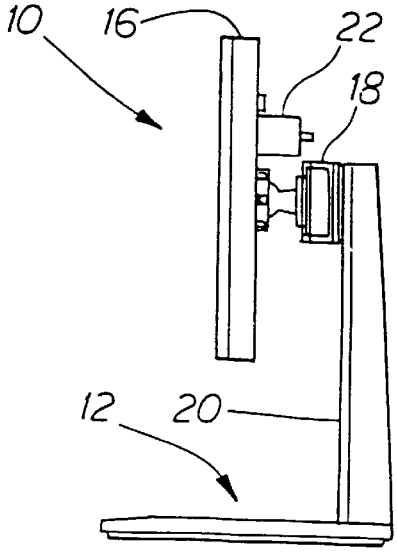
Figure 3:
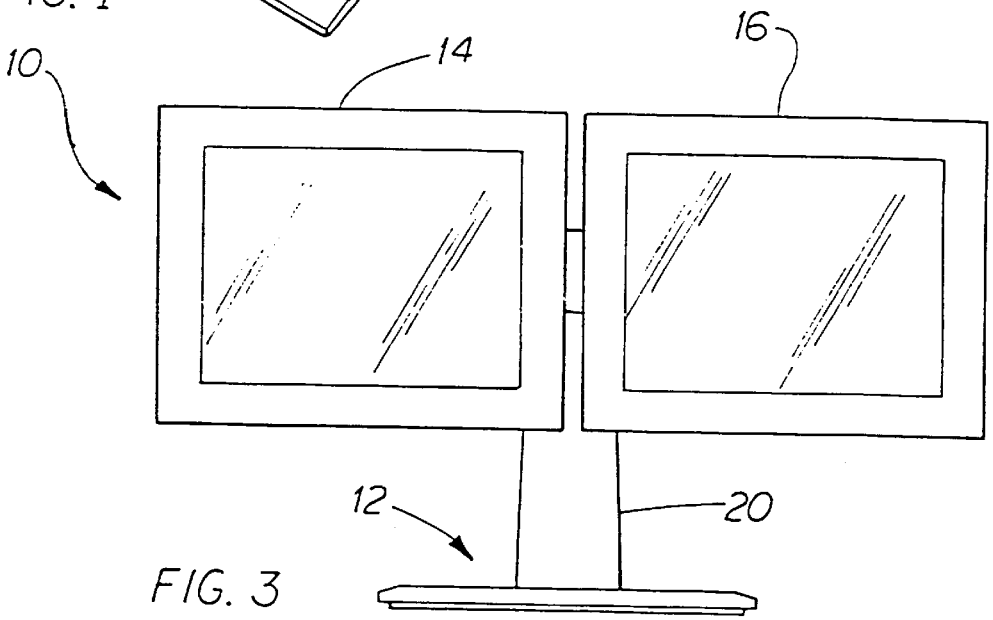
Figure 4:
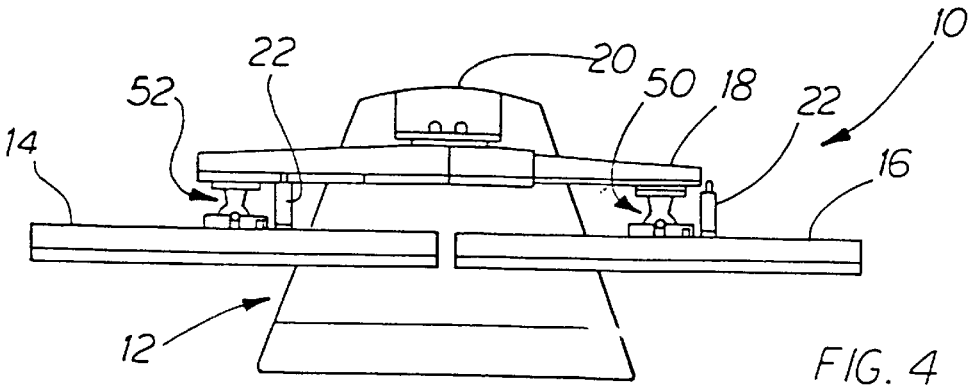
Figure 5:
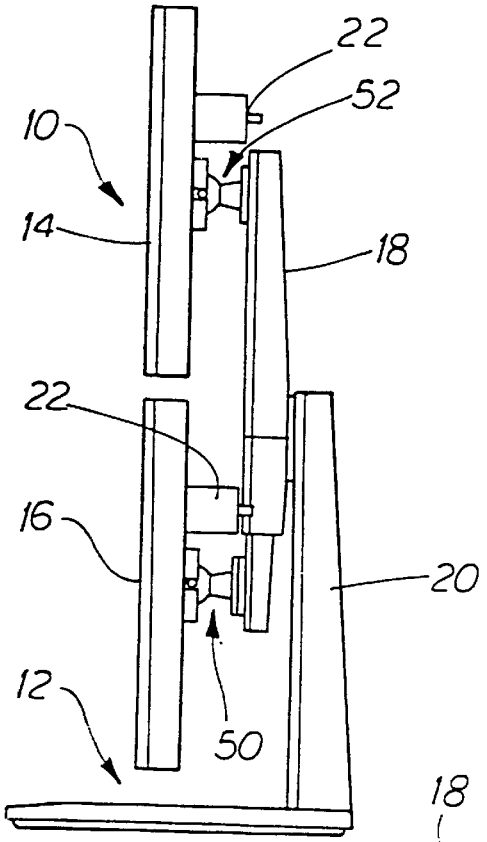
Figure 6:
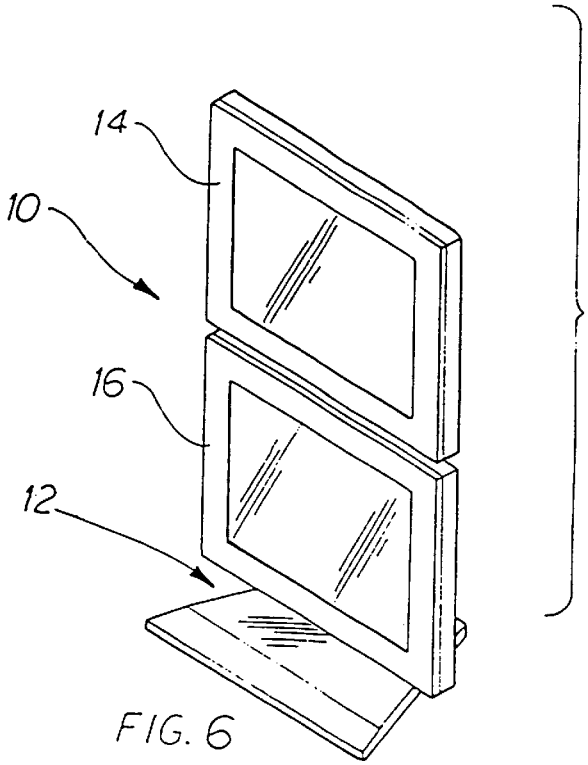

Reference is made to FIGS. 1–6 which illustrate a first display system 10 which includes a base 12 configured to stand on a horizontal surface and a pair of landscape displays 14, 16 (preferably liquid crystal displays). The displays 14, 16 are mounted to opposing ends of a telescopic arm 18, and a hollow upright 20 associated with the base 12 supports the arm 18 for rotation. Each display 14 or 16 has a conventional port 22 permitting coupling to a computer (not illustrated) through a conventional video board (not illustrated).

Figure 7:
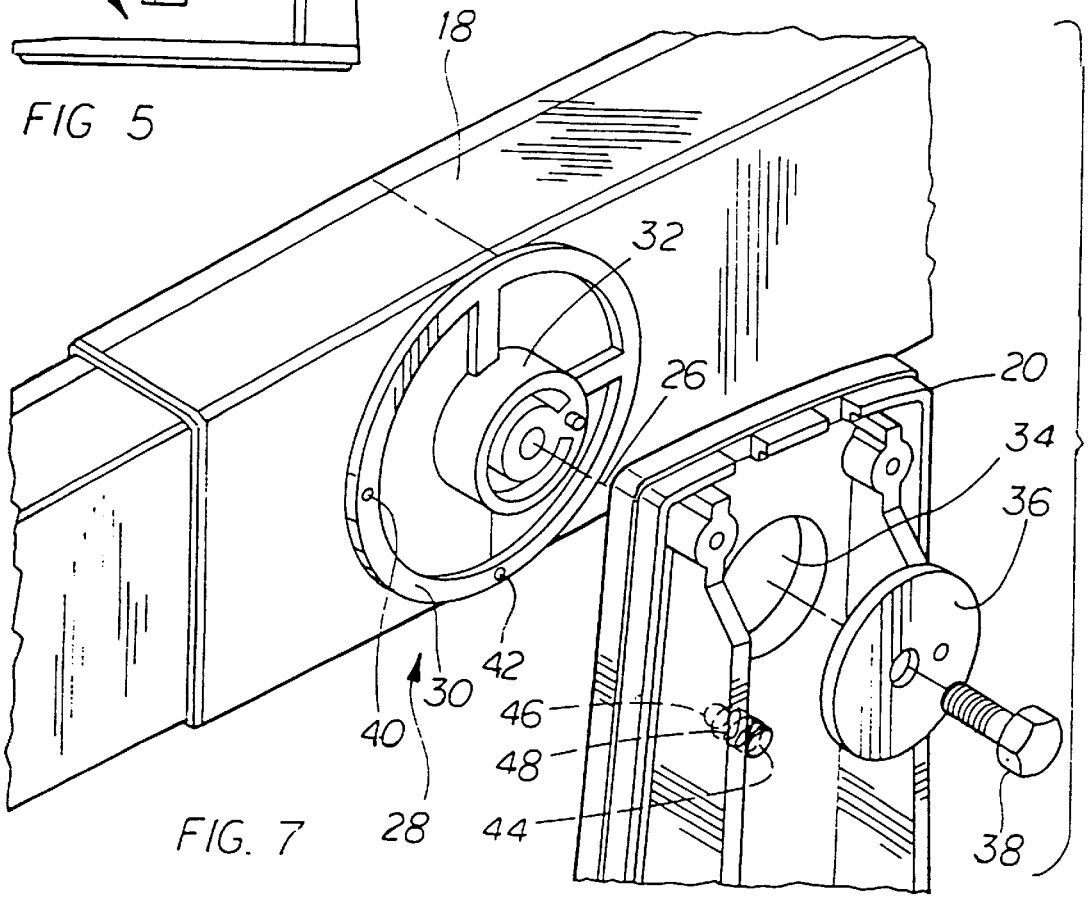
FIG. 7 is a partially exploded, fragmented perspective view detailing the mounting of an arm to a base of the display system.
Figure 8:
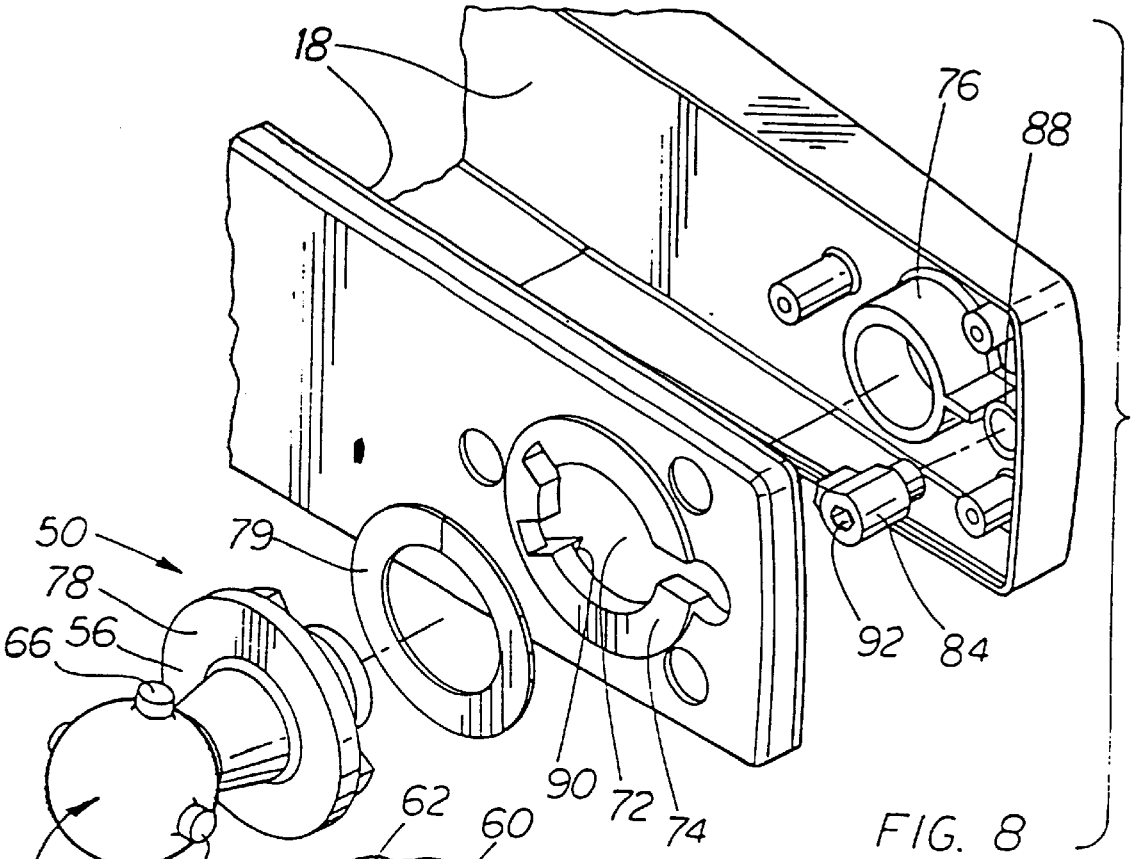
FIGS. 8 and 9 are exploded perspective views detailing how one display is mounted to the arm with a novel ball and socket joint.
Figure 9:
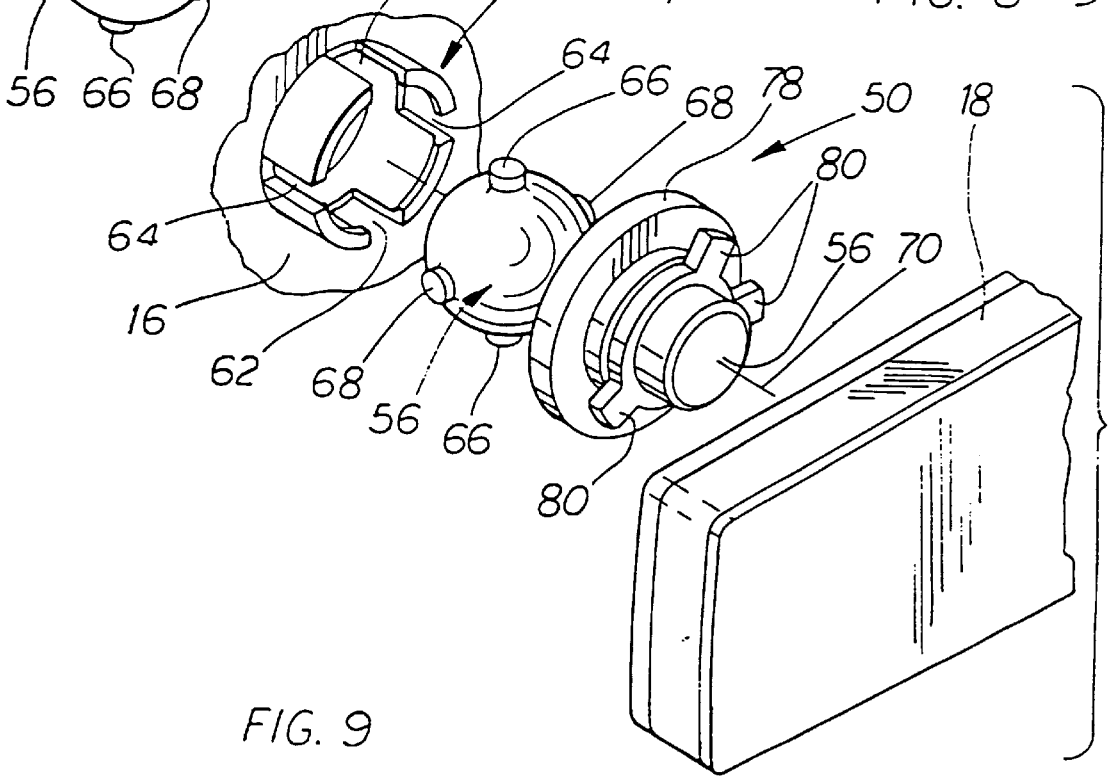
Figure 10:
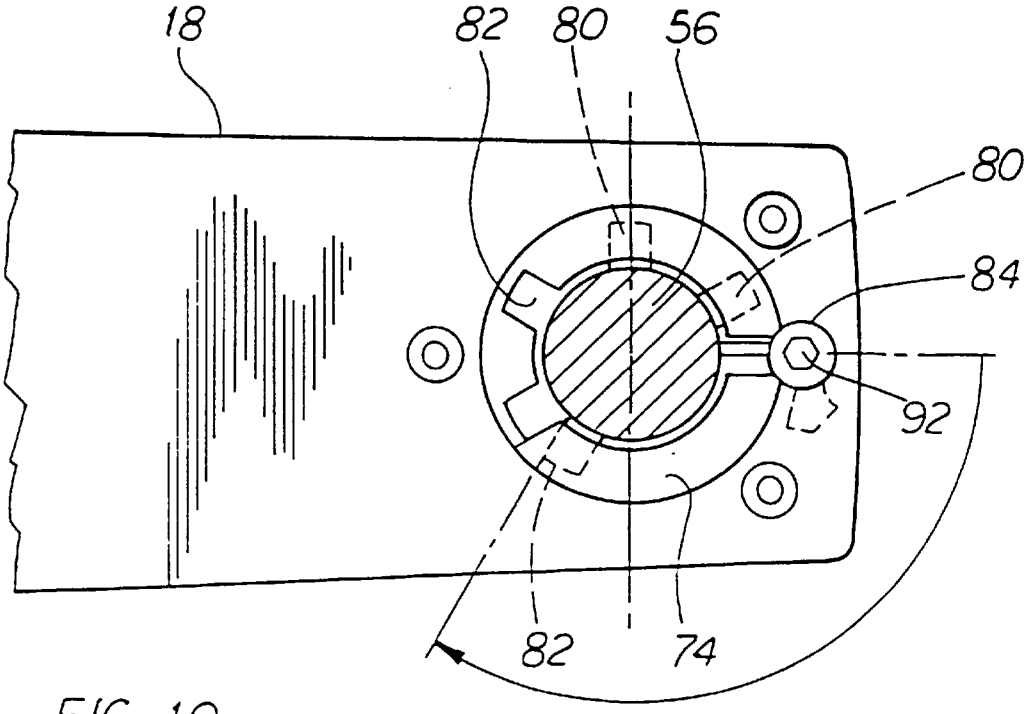
FIGS. 10 and 11 fragmented elevational views, partially cross-sectioned, illustrating how rotation of one display relative to the arm is restricted to a 90 degree range between two well-defined positions.

A rotary joint (detailed in the exploded view of FIG. 7) couples the arm 18 to the upright 20. The rotary joint is configured to perform two functions: to support the arm 18 for rotation about a generally horizontal axis 26 through the upright 20, and to define distinct vertical and horizontal arm positions. The rotary joint includes a connector 28 fixed centrally to the rear of the arm 18, which includes a circular track 30 and a generally circular central projection 32. The upright 20 carries a complementary connecting structure comprising a circular recess 34 that receives the projection 32, a washer 36, and a bolt 38 that fastens to the projection 32. The washer 36 extends radially beyond the circular recess 34 and abuts the inner surface of the upright 20 to retain the projection, and rotates with the projection about the generally horizontal axis 26.

A detent mechanism releasably locks the arm 18 in vertical and horizontal positions. Two indentations 40, 42 are formed in the circular track 30 at positions spaced circumferentially by 90 degrees. A cylindrical recess 44 in the upright 20 contains a ball 46 and a biasing spring 48 that urges the ball 46 against the track 30. The ball 46 seats in either indentation 40 or 42 to lock the arm 18 in its vertical or horizontal position but releases from either indentation 40 or 42 in response to manual rotation of the arm 18.

Mounting structure 50 that mounts one display 16 to the arm 18 is detailed in FIGS. 8–11. The mounting structure 50 is configured to perform two principal functions: to permit limited tilting of the display 16 about two mutually perpendicular axes, and to allow rotation of the display 16 relative to the arm 18 through a limited angle between two well-defined positions. The mounting structure 52 coupling the other display 14 to the arm 18 is substantially identical and will not be described.

The mounting structure 50 includes a ball joint comprising a steel ball 56 formed on a steel shaft 58 supported from the arm 18 and a plastic socket 60 supported from the rear of the display 16. The socket 60 is formed with four slots that are oriented parallel to the socket's receiving axis and appearing generally horizontal in the operative orientation of the socket 60. One pair of slots 62 is vertically registered, and another pair of slots 64 is horizontally registered. The ball 56 carries four cylindrical projections oriented in a common plane. One pair of projections 66 are aligned with a vertical axis (not shown) and extend from the ball 56 in opposite axial directions. Another pair of projections 68 are aligned with a horizontal axis (not shown) and extend from the ball 56 in opposite axial directions. The vertical projections 66 are received in the vertically registered slots 62, permitting free rotation of the display 16 about the vertical axis, but only limited rotation of the display 16 about the horizontal axis. The horizontal projections 68 are received in the horizontally registered slots 64, permitting free rotation of the display 16 about the horizontal axis, but only limited rotation of the display 16 about the vertical axis. This arrangement effectively permits only limited degree of tilting of the display 16 about two mutually perpendicular axes, in this implementation about vertical and horizontal axes. It should be noted that the slots might be formed on the exterior of the ball 56, and the projections might be fixed to the socket 60 and extend inwardly to engage the slots. The arrangement illustrated, in which the projections 66, 68 are fixed to the ball 56 and the slots 62, 64 are formed in the socket 60, permits easy manufacture and assembly. The slots 62, 64 extend rearward from the display 16 and terminate open-ended, facilitating insertion of the projections 66, 68 into the slots 62, 64 as the socket 60 receives the ball 56.

The shaft 58 is mounted for rotation relative to the arm 18 about a rotational axis 70 parallel to the generally horizontal axis 26 about which the arm 18 rotates. The arm 18 has a clearance hole 72 in its forward surface surrounded by a circular seating surface 74, and a cylindrical socket 76 within the arm 18 that is aligned with the rotational axis 70 and the clearance hole 72. The shaft 58 has an annular flange 78 that presses a split washer 79 against the circular seating surface 74 as the shaft 58 is inserted centrally through the clearance hole 72 into the socket 76. The shaft 58 has three projections or tabs oriented in a common plane and extending radially from the shaft 58. One pair of tabs 80 is closely spaced and a single tab 82 is positioned diametrically opposite the pair of tabs 80. The clearance hole 72 is configured to receive the tabs 80, 82 in a particular angular orientation as the shaft 58 is inserted into the socket 76, and rotation of the tabs 80, 82 from that particular angular orientation prevents removal of the shaft 58 from the arm 18. The tabs 80, 82 also function as stop structures cooperating with stop structures in the arm 18 to restrict rotation of the display 16, as explained below.

Figure 11:
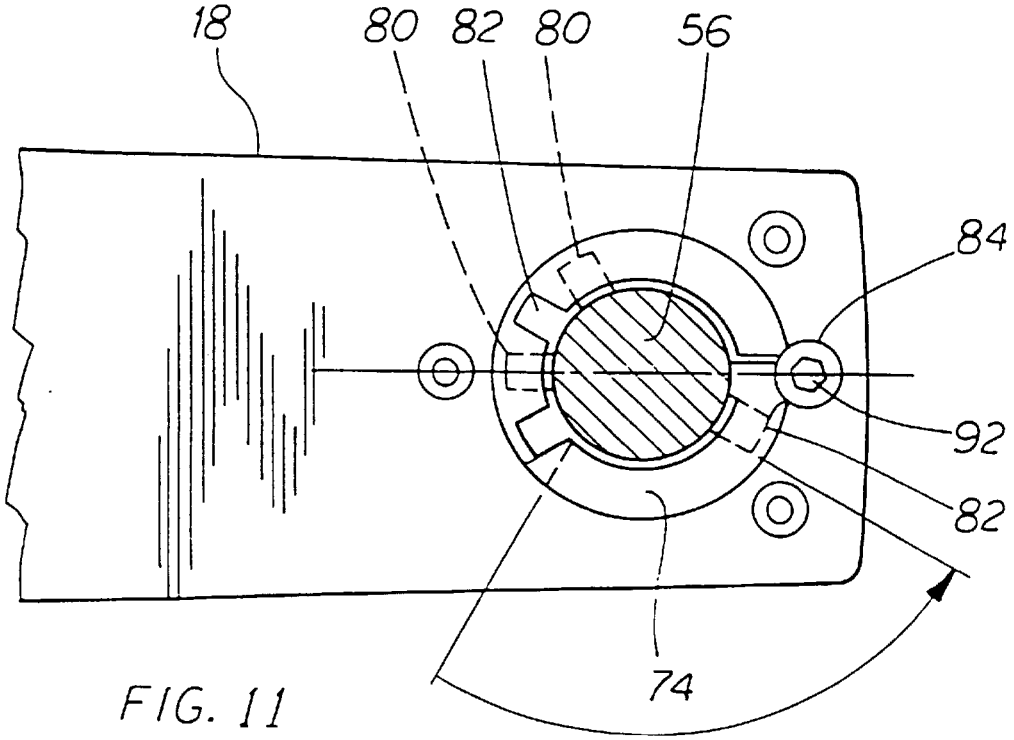

Rotation of the shaft 58 is restricted by two stops: a rotatable stop 84 that threads into a socket 88 within the arm 18 (complementary threads not shown), and a generally triangular fixed stop 90 formed on an inner surface of the arm 18. The rotatable stop 84 has a hexagonal key slot 92 to permit rotation of the stop 84 between a clearance position shown in FIG. 10 and an operative position shown in FIG. 11 in which the stop 84 engages an abutment molded with the cylindrical socket 76. After insertion into the socket 76, the shaft 58 is manually rotated clockwise until the single tab 82 passes the stop 84, for example, to one extreme angular position in which the single tab 82 abuts the fixed stop 90 as in FIG. 10. The rotatable stop 84 can then be placed in its operative position as shown in FIG. 11. When the shaft 58 is then rotated counterclockwise, the single tab 82 engages the rotatable stop 84 as shown in FIG. 11. Rotation of the shaft 58 and thus the display 16 relative to the arm 18 is restricted to 90 degrees between two extreme angular positions well-defined by the stops.

The two well-defined positions of the display 16 relative to the arm 18 correspond to the two well-defined positions of the arm 18 relative to the base 12. The display 16 position (relative to the arm 18) defined in FIG. 11 corresponds to the horizontal orientation of the arm 18 and preserves the landscape orientation of the display 16. The overall arrangement is apparent in FIGS. 3 and 4 where the arm 18 is horizontal and the displays 14, 16 are oriented in horizontally side-by-side relationship with their lengthwise axes (not illustrated) in an absolute horizontal orientation. The display 16 position (relative to the arm 18) defined in FIG. 10 corresponds to the vertical orientation of the arm 18 and once again preserves the landscape orientation of the display 16. The overall arrangement is apparent in FIGS. 5 and 6 where the arm 18 is vertical and the displays 14, 16 are vertically registered. The telescopic arm 18 is extended in its horizontal orientation to increase the spacing between the displays 14, 16, and contracted in its vertical orientation to decrease the spacing between the displays 14, 16, effectively accommodating the horizontal elongation of the displays 14, 16. A conventional detent mechanism may be mounted in the arm 18 to fix its different vertical and horizontal lengths.

Figure 12:
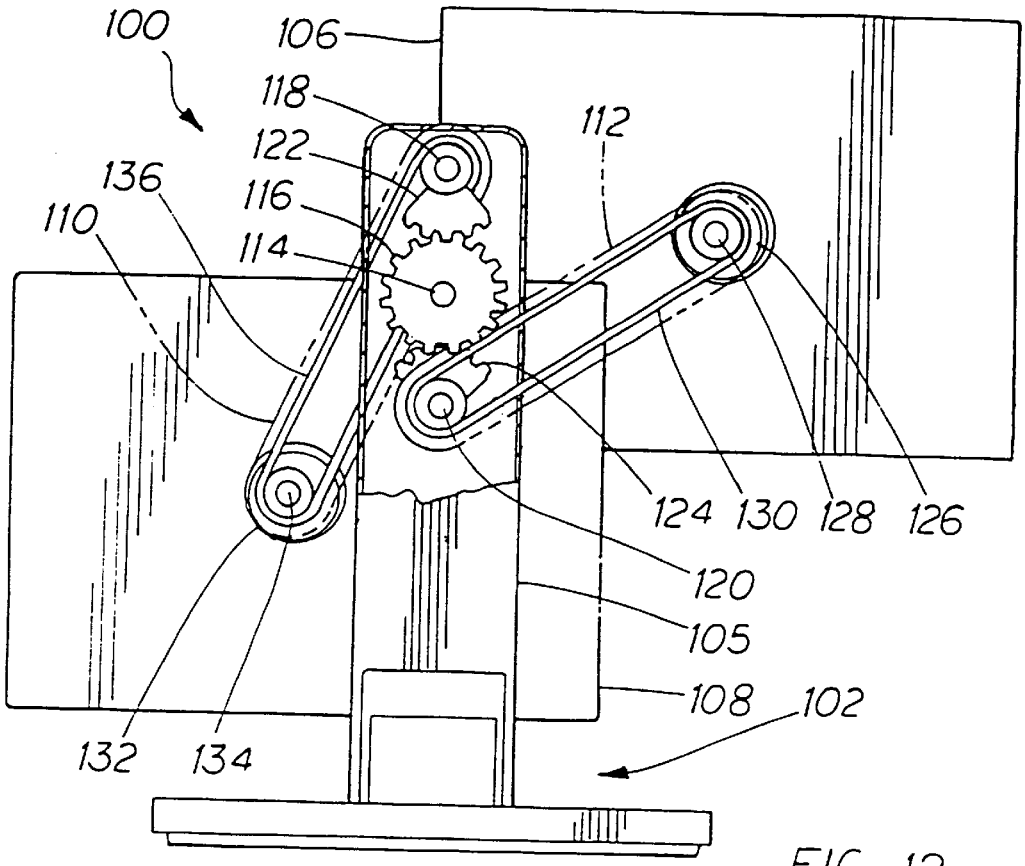
FIG. 12 is a rear elevation, partially sectioned, showing a second display system in which dual displays rotate in response to rotation of an arm assembly about a base.
Figure 13:
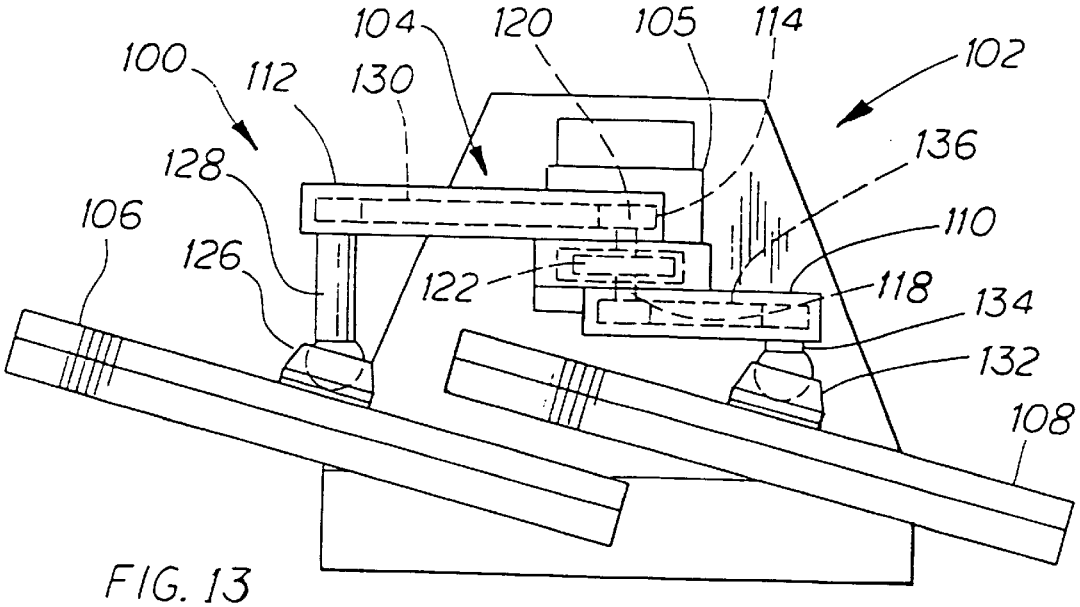
FIG. 13 is a plan view of the second display system from above showing linkage coupling the/arm and displays.

Reference is made to FIGS. 12 and 13 which illustrate a second display system 100 comprising a base 102, an arm assembly 104 that rotates about a generally horizontal axis from an upright 105 associated with the base 102, and a pair of landscape displays 106, 108 mounted to opposing ends of the arm assembly 104. The arms 110, 112 have not been shown in FIG. 12 to better illustrate linkage rotating the displays 106, 108 with the arm assembly 104.

The arm assembly 104 comprises a pair of distinct arms 110, 112 (apparent in FIG. 13), one arm 110 in front of the upright 105 and the other arm 112 behind the upright 105. The upright 105 supports a central shaft 114 for rotation about a generally horizontal central axis and a central toothed gear 116 is fixed to the central shaft 114. The arms 110, 112 are fixed to parallel rotary shafts 118, 120 mounted for rotation to the upright 105 about their lengthwise horizontal axes, one rotary shaft 118 above the central shaft 114 and the other rotary shaft 120 below the central shaft 114. Each arm 110 or 112 has a fixed end fixed to its respective rotary shaft 118 or 120 such that each rotates in a plane perpendicular to the lengthwise axis of the associated shaft 118 or 112, the two arms 110, 112 being horizontally spaced to avoid contact during such rotation. The upper and lower rotary shafts 118, 120 carry toothed part-circular gears 122, 124 (spanning 90 degree sectors) that are meshed with the circular central gear 116. The central shaft 114 and the meshed gears 116, 122, 124 constrain the upper and lower rotary shafts 118, 120 to rotate together in the same angular direction. Although not apparent, end teeth of the upper and lower part-circular gears 122, 124 are shaped to limit rotation of the gears 122, 124 relative to the central gear 116.

One display 106 is mounted with a ball joint 126 to a horizontal shaft 128, and the shaft 128 is mounted for rotation about its central horizontal axis to a free end of the rear arm 112. The ball joint 126 is preferably configured with pins and slots like the ball joint described above, to provide limited tilting of the display 106, but such a configuration has not been illustrated in FIG. 13. The rotary shafts 120, 128 associated with the rear arm 112 are coupled with a toothed belt 130 running on pulleys fixed to the shafts so that the display 106 rotates in response to rotation of the rotary shaft 120 and thus rotates relative to the rear arm 112. The other display 108 is mounted with a similar ball joint 132 to a shorter horizontal shaft 134, and the shorter shaft 134 is mounted for rotation about its horizontal central axis to the free end of the forward arm 110. The rotary shafts 118, 134 associated with the forward arm 110 are similarly coupled with a toothed belt 136 to coordinate rotation of the other display 108 in response to rotation of the rotary shaft 118 and thus rotates relative to the forward arm 110.

Figure 14:
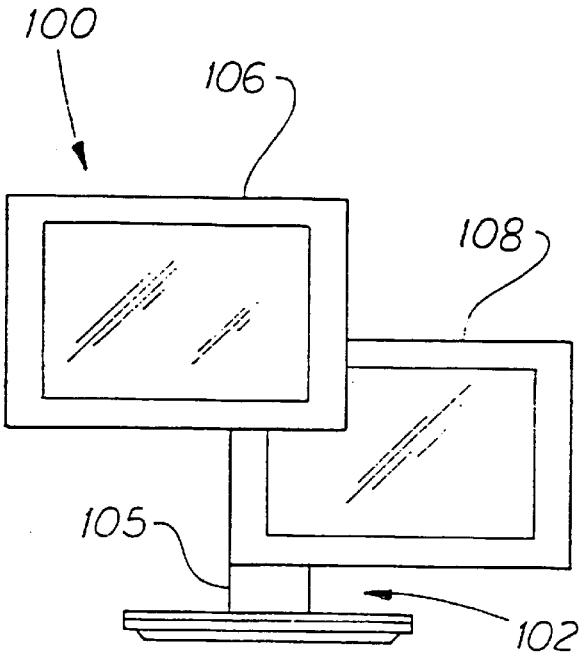
FIGS. 14–16 are front elevations showing different relative orientations of the displays of the second system.
Figure 15:
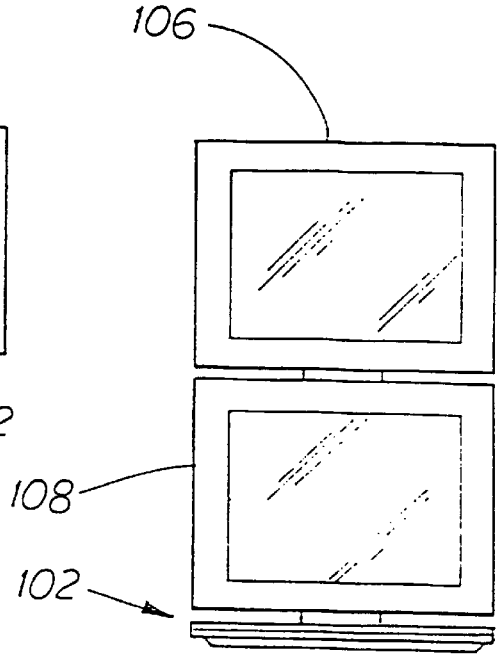
Figure 16:
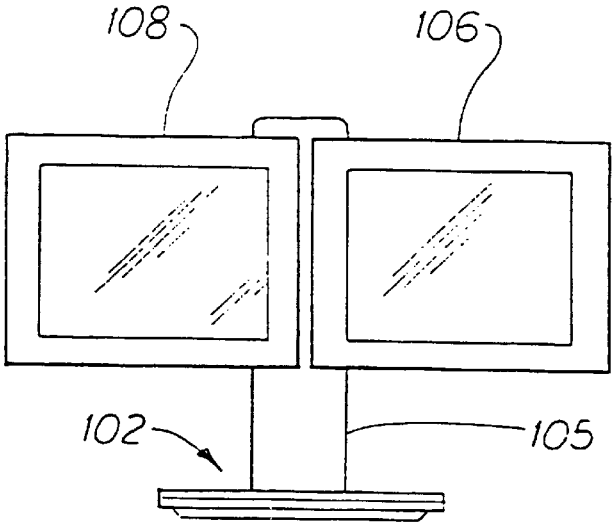

Various orientations of the second display system 100 are shown in FIGS. 14–16. The "diagonal" orientation of the two displays 106, 108 in FIG. 14 corresponds to the orientation of the arm assembly 104 and various gears in FIGS. 12 and 13. This is an intermediate orientation from which the arm assembly 104 can be rotated through about 45 degrees counterclockwise to achieve the vertically spaced orientation of the displays 106, 108 in FIG. 15 or about 45 degree clockwise to achieve the horizontally side-by-side orientation of the displays 106, 108 shown in FIG. 16. The arm assembly 104 is effectively coupled to each of the displays 106, 108 so that the absolute landscape orientation of the two displays 106, 108 is, for practical purposes, maintained as the arm assembly 104 rotates. In this embodiment, the displays 106, 108 must be titled to orient one effectively behind the other to allow rotation of the arm assembly 104. This can be avoided by lengthening the arms 110, 112 to increase the separation of the displays 106, 108.

The center-to-center spacing between the displays 106, 108 is automatically adjusted when the displays 106, 108 are placed in vertical or horizontal registration. When vertically registered, one display 108 is always located below the other display 106. From examination of FIG. 12, it will be apparent that the lower display 108 would then be supported by the arm 110 extending downward from the upper rotary shaft 120, and the upper display 106 would be supported with the arm 112 extending upward from the lower rotary shaft 118. The arms 110, 112 then overlap for a large portion of their length and the distance between their free ends and thus the centers of the displays 106, 108 is minimized. From the orientation of FIG. 12, to place the displays in horizontal registration, the arms 110 would swing upward and outward to one side of the upright 105 and the arm 112 would swing downward and outward on an opposing side of the upright 105, increasing the separation of their free ends and thus the center-to-center spacing of the displays 106, 108.

The automatic adjusting of the orientation of the displays 106, 108 can be implemented with a simpler arm assembly comprising just a single arm centrally mounted to a supporting base on a central rotary shaft. Belts or other linkages can be used to couple the central rotary shaft to rotary shafts supporting the displays 106, 108 to opposing ends of the single arm. However, use of two arms 110, 112 pivoting about separate axes permits simultaneous adjustment of display spacing.

Figure 17:
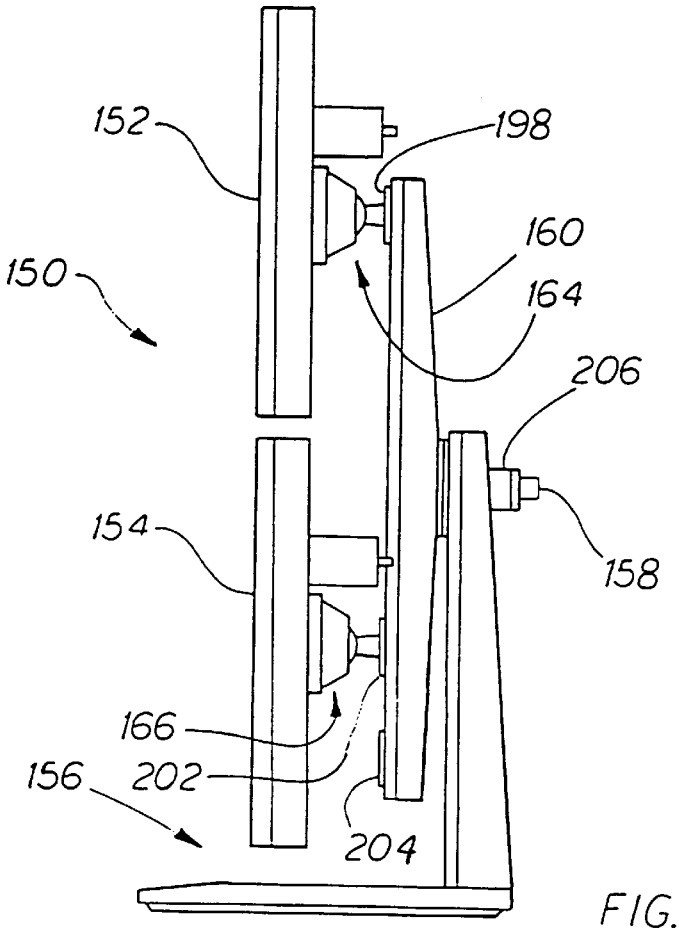
FIG. 17 is a side elevation showing a third display system with an arm vertical and supporting dual displays in vertical registration.
Figure 18:
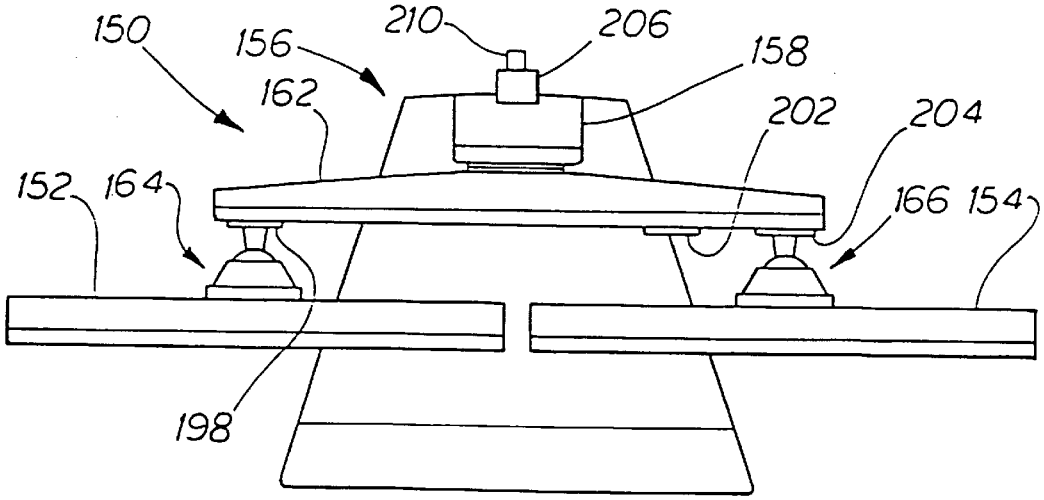
FIG. 18 is a plan view from above showing the third display system with the arm horizontal and supporting the display in horizontal registration.

Reference is made to FIGS. 17 and 18 which illustrate a third display system 150 which includes a pair of landscape displays 152, 154 and a base 156 with an upright 158. The third display system 150 uses an arm 162 that mounts to the upright 158 in only two orientations. In FIG. 17, the arm 162 is mounted to the upright 158 in a vertical orientation, and the displays 152, 154 are mounted to opposing ends of the arm 162 with a pair of identical connectors 164, 166. In FIG. 18, the arm 162 is mounted to the upright 158 in a horizontal orientation, and the displays 152, 154 are mounted to opposing ends of the longer arm 162 using the same connectors 164, 166. In each instance, the lengthwise axes of the displays 153, 154 are kept horizontal.

Figure 19:
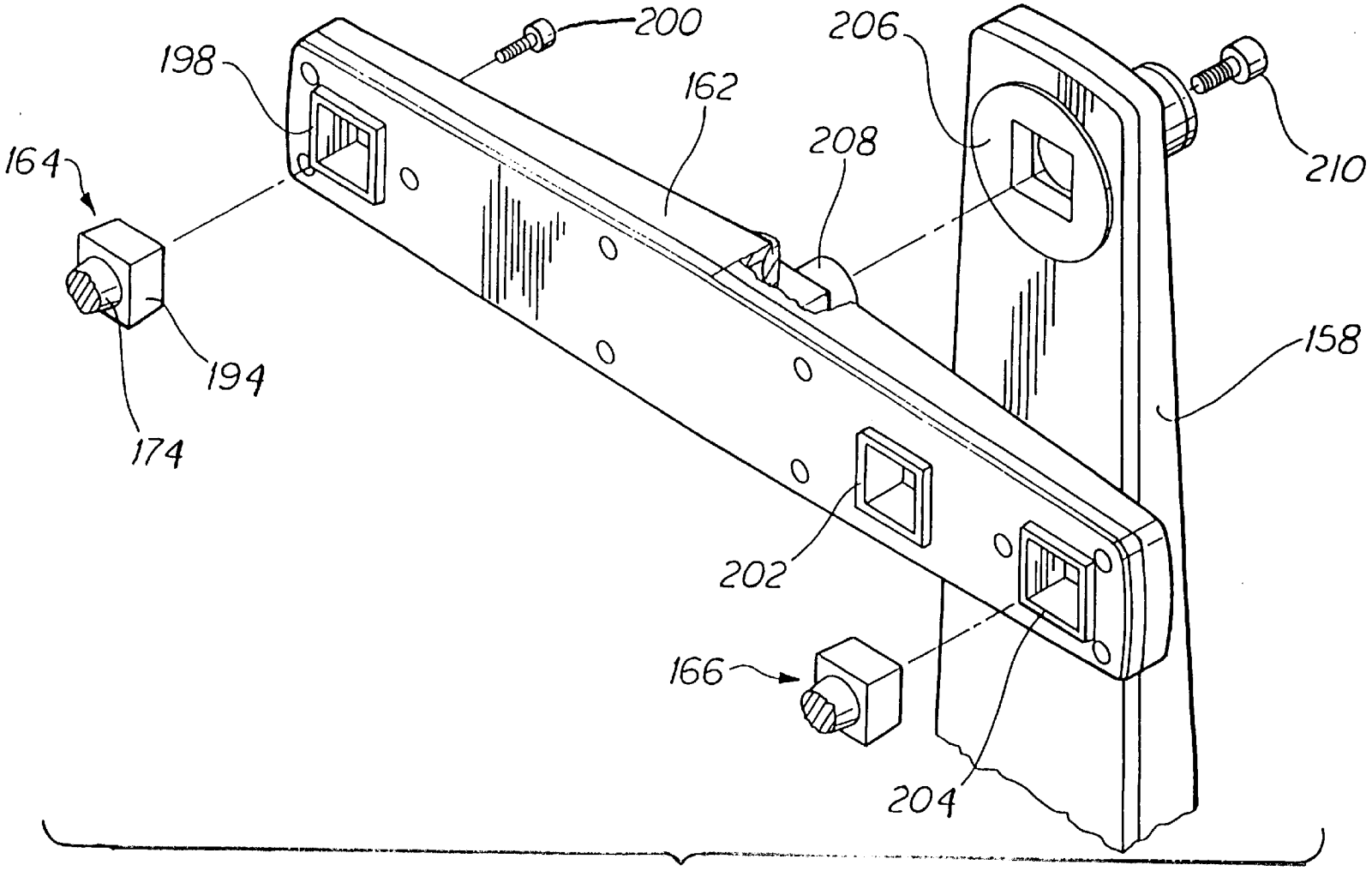
FIG. 19 is an exploded perspective view, extensively fragmented, detailing how the arm mounts to a base and how the displays mount to the arm; and, FIG. 20 is a perspective view of the a ball and socket joint used to mount one of the displays of the third display system.
Figure 20:
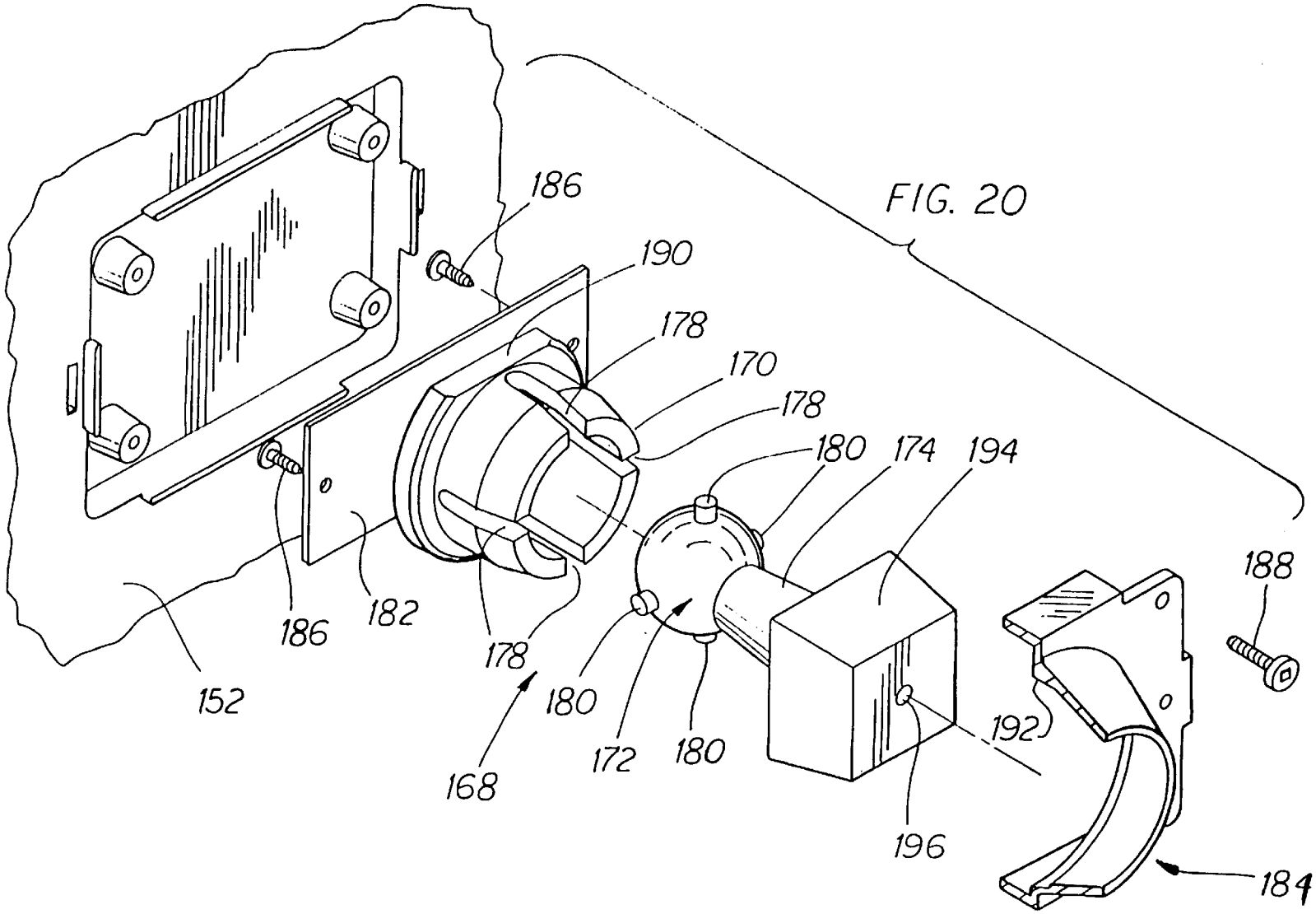

The connector 164 associated with one display 152 is shown in FIG. 20. The connector 164 includes a ball joint comprising a molded plastic socket 170 and an aluminum ball 172 formed with a shaft 174. The socket 170 is formed with slots 178 and the ball 172 is formed with projections 180, comparable to those above, which interlock to permit only limited tilting of the display 152 along two mutually perpendicular axes. A press is used to insert the ball 172 into the socket 170, and a housing comprising a plate 182 and a shell 184 closely conforming to the exterior of the socket 170 is mounted with screws 186 around the assembled ball 172 and socket 170. The plate 182 is then fastened with screws (such as the screw 188) to the back of the display 152. A flat 190 formed at the top of the socket 170 seats against a corresponding flat 192 in the shell 184 to prevent rotation of the socket 170 relative to the display 152. The shaft 174 is terminated with a plug 194 with a tapering square transverse cross-section and with a central threaded hole 196. As apparent in FIG. 19, the arm 162 has a connector, specifically, a socket 198 which conforms in shape to and interlocks with the plug 194 to support the display 152 and to prevent rotation of the display 152. The socket 198 is arranged on the arm 162 to receive the plug 194 in two distinct relative angular orientations spaced by 90 degrees, one in which the lengthwise axis of the display 152 is aligned with the length of the arm 162 (as in FIG. 18 where the arm 162 is horizontal) and another in which the lengthwise axis is perpendicular to the length of the arm 162 (as in FIG. 17 where the arm 162 is vertical). A bolt 200 (shown in FIG. 19) inserts through the socket 198 into the plug 194 to prevent separation.

The other display 154 is mounted to the arm 162 in a manner permitting adjustment of the spacing between the displays 152, 154. The connector 166 associated with the other display 154 is identical to the connector 164. The arm 162 has a pair of sockets 202, 204 identical to the socket 198 but mounted in an opposing end portion of the arm 162. The two sockets 202, 204 are axially spaced along the arm 162, one socket 204 located substantially at one end of the arm 162 and the other socket 202, inset from that end. Both sockets 202, 204 are shaped to interlock with the connector 166 to prevent relative rotation and to permit the lengthwise axis of the display 154 to be aligned with or oriented perpendicular to the length of the arm 162 according to whether the arm 162 is horizontally or vertically oriented.

The connectors used to join the arm 162 to the upright 158 are apparent in FIG. 19. The upright 158 has a socket 206 with a tapered square chamber aligned with a circular cylindrical chamber. The arm 162 carries a plug 208 which has a tapered square section and a circular cylindrical section, conforming to the socket 206. The socket 206 receives the plug 208 in two distinct relative angular orientations spaced by 90 degrees, which correspond to vertical and horizontal orientations of the arm 162. A bolt 210 inserts through a clearance hole (not illustrated) in the rear of the socket 206 and threads into the plug 208 to prevent relative axial separation of the socket 206 and plug 208.

How the display system 150 is used will be largely apparent from the foregoing description of its components. If the displays 152, 154 are to be horizontally registered (as in FIG. 18), the arm 162 is mounted to the upright 158 in a horizontal position, and the displays 152, 154 are mounted to the arm 162 with their lengthwise axes aligned with the length of the arm 162. The display 152 is mounted to the socket 204 at the end of the arm 162 to increase the spacing between the displays, accommodating their horizontal elongation. If the displays 152, 154 are to be vertically registered (as in FIG. 17), the arm 162 is mounted to the upright 158 in a vertical position, and the displays 152, 154 are mounted to the arm 162 with their lengthwise axes perpendicular to the length of the arm 162. The spacing between the displays 152, 154 is reduced by mounting the display 152 is mounted to the socket 202 inset from the end of the arm 162.

The display 152 may be mounted appropriate connection means that permit the display 152 for sliding between various axially spaced-apart positions along the arm 162. However, twin sockets 202, 204 are simple, adequate and comparatively inexpensive. Another alternative is to provide an arm assembly comprising two interchangeable arms of different length. Each arm may carry a pair of sockets (substantially identical to the socket 198) for mounting of the displays 152, 154 at opposing ends of the arm. Each arm may be fitted with a connector comparable to the plug 208 for mounting to the upright 158. The short armer may be mounted to the upright 158 in a vertical position for vertical registration of the displays 152, 154, and the longer arm may be mounted to the upright 158 in a horizontal orientation for mounting for horizontal registration of the displays 152, 154.

It will be appreciated that particular embodiments of the invention have been described and that modifications may be made therein without departing from the spirit of the invention or necessarily departing from the scope of the appended claims.

I claim:

1. A display system comprising:

a base;

a pair of electronic displays, each of the displays having an operative angular orientation relative to horizontal;

positioning means for positioning the displays selectively in vertically registered relationship and in horizontally registered relationship, the positioning means comprising:

(a) an arm assembly supporting the displays;

(b) support means for supporting the arm assembly from the base selectively in a first orientation relative to the base in which the displays are in their vertically registered relationship and in a second orientation in which the displays are in their horizontally registered relationship; and, (c) mounting means for mounting the displays to the arm assembly, the mounting means comprising means for adjusting the angular orientation of each of the displays relative to the arm assembly thereby to orient each of the displays in its operative angular orientation when the arm assembly is in either one of its first and second orientations.

2. The display system of claim 1 in which:

the support means support the arm assembly for rotation about a generally horizontal axis; and, the mounting means mount each of the displays to the arm assembly for relative rotation about a rotational axis substantially parallel to the generally horizontal axis.

3. The display system of claim 2 in which:

the support means comprise means for releasably locking the arm assembly to the base in its first and second orientations; and, the mounting means comprise means permitting rotation of each of the electronic displays only between a pair of extreme angular positions relative to the arm assembly, each of the angular positions corresponding to a different one of the first and second orientations of the arm assembly such that the display is oriented in its operative angular orientation whenever the arm assembly is locked to the base in either of the first and second positions and the display is rotated to its corresponding angular position.

4. The display system of claim 3 in which the mounting means comprise:

a shaft fixed to one of the displays and aligned with the rotational axis of the one display;

means fixed to the arm assembly and supporting the shaft for rotation about the rotational axis of the one display; and, complementary stop structures fixed to the shaft and to the arm assembly and positioned to engage as the shaft rotates relative to the arm assembly.

5. The display system of claim 2 in which:

the support means permit displacement of the arm assembly on the base between the first and second orientations; and, the means for adjusting the angular orientation of the displays comprise means supporting each of the displays for rotation relative to the arm assembly and means coupling each of the displays to the arm assembly for rotation in response to displacement of the arm assembly between the first and second orientations.

6. The display system of claim 1 in which:

each of the displays is horizontally elongate in its operative angular orientation; and, the arm assembly is an elongate telescopic member and the displays are mounted to opposing ends of the arm assembly such that the spacing of the displays in their horizontally and vertically registered relationships can be adjusted.

7. The display system of claim 1 in which the mounting means are adapted to permit tilting of one of the displays about a pair of mutually perpendicular axes, the mounting means comprising:

a ball supported from one of the display and the arm assembly;

a socket supported from the other of the display and the arm assembly and containing the ball;

a multiplicity of projections fixed to one of the ball and the socket, the multiplicity of projections comprising one pair of projections extending in opposite directions along one of the mutually perpendicular axes and another pair of projections extending in opposite directions along the other of the mutually perpendicular axes; and, a multiplicity of slots formed in the other of the ball and the socket, the multiplicity of slots comprising a pair of opposing slots each of which receives a different one of the one pair of projections and another pair of opposing slots each of which receives a different one of the other pair of projections.

8. The display system of claim 7 in which the projections are fixed to the ball and the slots are formed in the socket.

9. The display system of claim 1 in which:

each of the displays is horizontally elongate in its operative angular orientation;

a predetermined one of the displays is below the other of the displays in their vertically registered relationship;

the support means comprise upper and lower rotary shafts in parallel relationship and means mounting the shafts to the base for rotation about their respective lengthwise axes;

the arm assembly comprises a pair of horizontally spaced-apart arms, each of the arms has a fixed end and a free end, one of the arms has its fixed end fixed to the upper shaft such that the one arm rotates in a plane perpendicular to the upper shaft in response to rotation of the upper shaft, the other of the arms has its fixed end fixed to the lower shaft such that the other arm rotates in a plane perpendicular to the lower shaft in response to rotation of the upper shaft; and, the one display is mounted to the free end of the one arm and the other display is mounted to the free end of the other arm.

10. The display system of claim 9 comprising constraining means constraining the rotary shafts to rotate together in opposite angular directions.

11. The display system of claim 10 in which the means for adjusting the angular orientation of the displays comprise:

means supporting each of the displays for rotation about a generally horizontal rotational axis relative to the arm to which the display is mounted; and, coupling means coupling the one display to the upper shaft and the other display to the lower shaft such that the displays rotate in response to rotation of the rotary shafts.

12. The display system of claim 11 in which:

the constraining means comprise an upper gear fixed to the upper shaft, a lower gear fixed to the lower shaft, a central rotary shaft mounted for rotation to the base between the upper and lower shafts, and a gear fixed to the central rotary shaft and meshed with the upper and lower gears;

the means supporting each of the displays for rotation comprise a pair of rotary shafts each mounted for rotation to a different one of the arms and each supporting a different one of the displays; and, the coupling means comprise a pair of belts, each of the belts couples a different one of the pair of rotary shafts supporting the displays to a different one of the upper and lower rotary shafts.

13. The display system of claim 1 in which:

each of the displays is elongate along a horizontal axis of the display when oriented in its operative angular orientation;

the arm assembly comprises an elongate arm; and, the mounting means comprise connector means for connecting one of the displays to the arm at positions spaced along the arm, whereby, the spacing between the displays can be adjusted.

14. The display system of claim 13 in which the connector means for connecting the one display to the arm comprise:

a first socket mounted to the arm proximate to one end thereof;

a plug mounted to the one display and shaped to interlock with the socket to prevent rotation of the plug relative to the socket, the socket being shaped to receive the plug in either of a pair of orientations that are rotated substantially by 90 degrees, the socket being positioned on the arm such that the horizontal axis of the one display is aligned with the length of the arm when the plug is in one of the orientations and the horizontal axis of the one display is perpendicular to the length of the arm in the other of the relative angular positions; and, a second plug socket mounted to the arm proximate to the one end thereof and substantially identical to the first plug, the first and second plugs being spaced apart along the arm.

15. The display system of claim 14 in which the support means comprise:

a plug fixed to the arm; and, a socket fixed to the base and shaped to interlock with the plug fixed to the arm when the arm is in a vertical orientation and when the arm is in a horizontal orientation, the plug fixed to the arm and the socket fixed to the base being shaped to prevent rotation of the arm relative to the base when interlocked.

*16. A display system comprising:*

*a base member;*

*a pair of electronic displays;*

*positioning means for positioning the displays, the positioning means comprising:*

*(a) an arm assembly for supporting the displays;*

*(b) support means for supporting the arm assembly from the base member; and*

*(c) mounting means for mounting the displays to the arm assembly, the mounting means comprising means for adjusting the angular orientation of each of the displays relative to the arm assembly to thereby permit said displays to be angled toward each other to a desired degree.*

*17. A display system comprising:*

*a pair of electronic displays;*

*positioning means for positioning the displays, the positioning means comprising:*

*(a) an arm assembly for supporting the displays;*

*(b) support means having a base for supporting the arm assembly above a support surface; and*

*(c) mounting means for mounting the displays to the arm assembly, the mounting means comprising means for adjusting the angular orientation of each of the displays relative to the arm assembly about a generally vertical axis to thereby permit said displays to be angled relative to each other to a desired degree.*

* * * * *

UNITED STATES PATENT AND TRADEMARK OFFICE

CERTIFICATE OF CORRECTION

PATENT NO. : Re. 36,978
DATED : December 5, 2000
INVENTOR(S) : Moscovitch

It is certified that error appears in the above-identified patent and that said Letters Patent is hereby corrected as shown below:

Column 2,
Line 13, add -- be -- after "may".

Column 3,
Line 2, remove "/".

Column 3,
Line 15, remove "a" after "the".

Column 6,
Line 20, remove "titled" and insert -- tilted --.

Column 8,
Line 4, insert -- to -- after "mounted".

Column 12,
Line 9, delete "support means having" at beginning of sentence.

Signed and Sealed this

Thirteenth Day of November, 2001

*Attest:*

Nicholas P. Godici

NICHOLAS P. GODICI
*Acting Director of the United States Patent and Trademark Office*

*Attesting Officer*

UNITED STATES PATENT AND TRADEMARK OFFICE

CERTIFICATE OF CORRECTION

PATENT NO. : RE 36,978
DATED : December 5, 2000
INVENTOR(S) : Jerry Moscovitch

It is certified that error appears in the above-identified patent and that said Letters Patent is hereby corrected as shown below:

Column 12,
Line 8, at the beginning of paragraph b), insert -- support means having --

Signed and Sealed this

Tenth Day of May, 2005

JON W. DUDAS
*Director of the United States Patent and Trademark Office*

US00RE36978C1

(12) EX PARTE REEXAMINATION CERTIFICATE (8200th)

United States Patent
Moscovitch

(10) Number: US RE36,978 C1
(45) Certificate Issued: May 10, 2011

(54) DUAL DISPLAY SYSTEM

(76) Inventor: Jerry Moscovitch, Toronto (CA)

Reexamination Request:
No. 90/009,701, Mar. 4, 2010
No. 90/010,883, Mar. 19, 2010

Reexamination Certificate for:

| | |
|---|---|
| Patent No.: | **Re. 36,978** |
| Issued: | **Nov. 18, 1997** |
| Appl. No.: | **09/172,193** |
| Filed: | **Oct. 13, 1998** |

Certificate of Correction issued Nov. 13, 2001.

Certificate of Correction issued May 10, 2005.

Related U.S. Patent Documents

Reissue of:

| | |
|---|---|
| (64) Patent No.: | **5,687,939** |
| Issued: | **Nov. 18, 1997** |
| Appl. No.: | **08/638,158** |
| Filed: | **Apr. 26, 1996** |

(51) Int. Cl.
*F16M 11/00* (2006.01)

(52) U.S. Cl. ..... 248/122.1; 248/921; D14/373
(58) Field of Classification Search ..... None
See application file for complete search history.

(56) References Cited

U.S. PATENT DOCUMENTS

| | | | | |
|---|---|---|---|---|
| 2,890,010 | A | 6/1959 | Barkheimer et al. | |
| 2,937,381 | A | 5/1960 | Manas | |
| 3,262,517 | A | 7/1966 | Malec | |
| 3,514,871 | A | 6/1970 | Tucker | |
| 4,112,423 | A | 9/1978 | Bertolasi | |
| 4,159,417 | A | 6/1979 | Rubicam | |
| 4,267,555 | A | 5/1981 | Boyd et al. | 340/748 |
| 4,438,458 | A | 3/1984 | Munscher | |
| 4,453,687 | A | 6/1984 | Sweere | |
| D278,820 | S | 5/1985 | Woodhall | |

(Continued)

FOREIGN PATENT DOCUMENTS

| | | |
|---|---|---|
| DE | 4027556 | 3/1992 |
| DE | 9406985 | 10/1995 |
| FR | 2554269 | 5/1985 |
| GB | 2200783 | 8/1988 |
| GB | 2269516 | 2/1994 |

(Continued)

OTHER PUBLICATIONS

Graphics and Design Publication (labeled DEL 004579; "early 90's".
Ergotron LAN Racking and Cable Management Systems Product Catalog (labeled DEL 004580); Mar. 1, 1995.

(Continued)

*Primary Examiner*—William C Doerrler

(57) ABSTRACT

A display system includes a base, a pair of electronic displays, and an arm assembly that supports the displays from the base in vertical or horizontal registration. In one implementation, the arm assembly is a single telescopic member that rotates relative to the base and locks in vertical and horizontal orientations, the displays rotate relative to the member between corresponding extreme angular positions in which the operative angular orientation of the displays relative to horizontal is maintained, and the length of the member is adjusted to minimize separation of the displays. In other implementation, the arm assembly has separate arms rotating about vertically spaced axes and linked to minimized the separation of the displays automatically when vertically or horizontally registered. In a simple implementation, the arm assembly is a rigid arm that releasably attaches to the base only in vertical and horizontal orientations, the displays mounted releasably to the arm in pre-defined angular orientations that preserved operative angular orientation, and one display can be connected to the arm at spaced apart position to adjust separation of the displays.

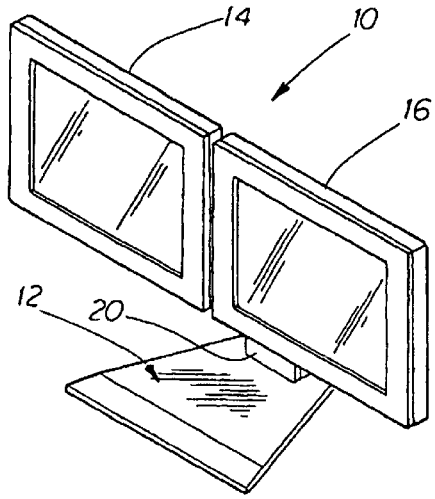

U.S. PATENT DOCUMENTS

| | | | | |
|---|---|---|---|---|
| 4,547,027 | A | 10/1985 | Scheibenreif | |
| 4,589,713 | A | 5/1986 | Pfuhl et al. | |
| 4,619,429 | A | 10/1986 | Mazza | |
| 4,646,875 | A | 3/1987 | Sholl | 182/2 |
| 4,662,797 | A | 5/1987 | Helgeland | 358/254 |
| 4,768,744 | A | 9/1988 | Leeds et al. | |
| 4,814,759 | A | 3/1989 | Gombrich et al. | |
| 4,831,368 | A | 5/1989 | Masimo et al. | 340/720 |
| 4,836,478 | A | 6/1989 | Sweere | |
| 4,920,458 | A | 4/1990 | Jones | |
| 5,012,345 | A | 4/1991 | Elworthy | |
| 5,035,392 | A | 7/1991 | Gross et al. | |
| 5,067,834 | A | 11/1991 | Szmanda et al. | |
| 5,076,524 | A | 12/1991 | Reh | |
| 5,122,941 | A | 6/1992 | Gross et al. | |
| 5,128,662 | A | 7/1992 | Failla | |
| 5,134,390 | A | 7/1992 | Kishimoto et al. | 340/727 |
| 5,177,616 | A | 1/1993 | Riday | 358/254 |
| 5,179,447 | A | 1/1993 | Lain | |
| 5,195,709 | A | 3/1993 | Yasushi | |
| 5,210,656 | A | 5/1993 | Williamson | |
| 5,222,780 | A | 6/1993 | Reh et al. | |
| 5,224,861 | A | 7/1993 | Glass et al. | |
| D340,235 | S | 10/1993 | Robak | |
| 5,278,779 | A | 1/1994 | Conway et al. | |
| 5,316,369 | A | 5/1994 | Kanda | |
| 5,329,289 | A | 7/1994 | Sakamoto et al. | |
| 5,337,676 | A | 8/1994 | Ahad | |
| 5,383,642 | A | 1/1995 | Strassberg | |
| 5,467,102 | A | 11/1995 | Kuno et al. | |
| 5,494,447 | A | 2/1996 | Zaidan | |
| 5,505,424 | A | 4/1996 | Niemann | 248/585 |
| D371,449 | S | 7/1996 | Huang | |
| 5,534,888 | A | 7/1996 | Lebby et al. | |
| 5,537,127 | A | 7/1996 | Jingu | |
| 5,537,290 | A | 7/1996 | Brown et al. | |
| 5,547,248 | A | 8/1996 | Marechal | |
| 5,590,021 | A | 12/1996 | Register | |
| 5,594,620 | A | 1/1997 | Register | |
| 5,668,570 | A | 9/1997 | Ditzik | |
| 5,673,170 | A | 9/1997 | Register | |
| 5,675,687 | A | 10/1997 | Wood | |
| 5,687,939 | A | 11/1997 | Moscovitch | 248/122.1 |
| 5,729,429 | A | 3/1998 | Margaritis et al. | |
| 5,732,922 | A | 3/1998 | Jeon | |
| D395,298 | S | 6/1998 | Rosen | |
| 5,768,163 | A | 6/1998 | Smith, II | |
| 5,820,623 | A | 10/1998 | Ng | |
| 5,847,698 | A | 12/1998 | Reavey et al. | |
| 5,867,210 | A | 2/1999 | Rod | |
| 5,914,698 | A | 6/1999 | Nicholson et al. | |
| RE36,978 | E | 12/2000 | Moscovitch | 248/122.1 |

FOREIGN PATENT DOCUMENTS

| | | |
|---|---|---|
| JP | 62197815 | 9/1987 |
| JP | 6323417 | 9/1988 |
| JP | 3291722 | 12/1991 |
| JP | 04015680 | 1/1992 |
| JP | 6161703 | 6/1994 |
| JP | 7160364 | 6/1995 |

OTHER PUBLICATIONS

Computer Racking System Publication (labeled E–031476); Managing Office Technology; Aug. 1993.

Galileo 15 advertisement from Specialized Technology Group, date on the front page of "Sep. 8, 1998".

Smart Glas by PixelVision adverstisement; p. 5 includes "Specifications accurate as of Aug. 7, 1998".

Two pages from Bloomberg Financial Markets Commodities News; Bates Nos. M198268–M198269; following copyright symbol on bottom left portion of second page is the year 1996 or 1998.

Page from Bloomberg Financial Markets Commodities News, "The Bloomberg Flat Panel, The Next Generation"; Bates No. M198271; circa 1994–1996.

Ergotron Ergonomic Computer Workstations Component Product Catalog (labeled DEL 004607–DEL 004648; Jul. 1, 1992).

PC Workstation Publication (labeled DEL 004692 and also E–031429); Modern Office Technology; Nov. 1988.

National TeleVAR Publication (labeled DEL 004693); TypeWorld; First Aug. 1990; Issue 11.

Raster Devices 2 Direct Inc. (labeled DEL 004690); Mar. 1990.

Ergotron Postcard Publication (labeled DEL 004691); 1992.

Raster Devices 2 Direct Inc. (labeled DEL 004689); Apr. 1990.

Ergotron Postcard Publication (labeled DEL 004570); 1992.

Mac II Workstation publication (labeled DEL 004571–DEL 004572); MacWEEK; Oct. 11, 1998.

Mac II Workstation publication (labeled DEL 004573); MacWEEK; Oct. 11, 1998.

Ergotron Design Station Publication (labeled DEL 004574).

Raster Devices 2 Direct Inc. Publication (labeled DEL 004575); Apr. 1990.

Raster Devices 2 Direct Inc. Publication (labeled DEL 004576); Mar. 1990.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 1-8, 13, 16 and 17 is confirmed.

New claims 18-38 are added and determined to be patentable.

Claims 9-12, 14 and 15 were not reexamined.

18. The display system of claim 16, wherein:

(i) the mounting means mounts a rear portion of one display of the pair of electronic displays to the arm assembly;

(ii) the mounting means permits the one display to assume a first angular position and a second angular position, the second angular position being obtained from the first angular position by rotating the one display 90 degrees with respect to the arm assembly about a rotation axis substantially perpendicular to a screen of the one display; and

(iii) the positioning means allows positioning of the rear portion at a plurality of distances from the support means to minimize a spacing between adjacent edges of the pair of electronic displays in the first angular position and in the second angular position.

19. The display system of claim 16, wherein the base member is configured to stand on a horizontal surface of a desk.

20. The display system of claim 19, wherein the base member includes a substantially flat, horizontal member for standing on the horizontal surface.

21. The display system of claim 16, wherein the arm assembly includes a rigid arm that projects from one side of the support means and from an opposite side of the support means.

22. The display system of claim 16, wherein the arm assembly projects horizontally from the support means.

23. The display system of claim 16, wherein the arm assembly consists of directly connected components.

24. The display system of claim 16, wherein the positioning means positions the pair of electronic displays such that a distance between centers of the pair of electronic displays is selectively variable to thereby minimize a spacing between adjacent edges of the pair of electronic displays.

25. The display system of claim 16, wherein:

the arm assembly comprises an elongate arm; and the mounting means comprises connector means for connecting one of the displays to the arm at positions spaced along the arm, whereby the spacing between the displays can be adjusted.

26. The display system of claim 16, wherein the positioning means allow one of the pair of electronic displays to be positioned at a plurality of locations on the arm assembly to permit the distance between the pair of electronic displays to be varied to thereby minimize a spacing between the pair of electronic displays.

27. The display system of claim 16, wherein:

(i) the mounting means mounts a rear portion of one display of the pair of electronic displays to the arm assembly;

(ii) the mounting means permits the one display to assume a first angular position and a second angular position, the second angular position being obtained from the first angular position by rotating the one display 90 degrees with respect to the arm assembly about a rotation axis substantially perpendicular to a screen of the one display;

(iii) the positioning means allows positioning of the rear portion at a plurality of distances from the support means to minimize a spacing between adjacent edges of the pair of electronic displays in the first angular position and in the second angular position;

(iv) the base member projects horizontally from the bottom of the support means and is configured to stand on a horizontal surface of a desk; and

(v) the arm assembly consists of directly connected components, said arm assembly projecting horizontally from the support means.

28. The display system of claim 17, wherein:

(i) the mounting means mounts a rear portion of one display of the pair of electronic displays to the arm assembly;

(ii) the mounting means permits the one display to assume a first angular position and a second angular position, the second angular position being obtained from the first angular position by rotating the one display 90 degrees with respect to the arm assembly about a rotation axis substantially perpendicular to a screen of the one display; and

(iii) the positioning means allows positioning of the rear portion at a plurality of distances from the support means to minimize a spacing between adjacent edges of the pair of electronic displays in the first angular position and in the second angular position.

29. The display system of claim 17, wherein the support surface is a horizontal surface of a desk and the base is configured to stand on the horizontal surface.

30. The display of claim 29, wherein the base includes a substantially flat, horizontal member for standing on the horizontal surface.

31. The display system of claim 17, wherein the arm assembly includes a rigid arm that projects from one side of the support means and from an opposite side of the support means.

32. The display system of claim 17, wherein the arm assembly projects horizontally from the support means.

33. The display system of claim 17, wherein the arm assembly consists of directly connected components.

34. The display system of claim 17, wherein the positioning means positions the pair of electronic displays such that a distance between centers of the pair of electronic displays is selectively variable to thereby minimize a spacing between adjacent edges of the pair of electronic displays.

35. The display system of claim 17, wherein:

the arm assembly comprises an elongate arm; and, the mounting means comprises connector means for connecting one of the displays to the arm at positions spaced along the arm, whereby the spacing between the displays can be adjusted.

36. The display system of claim 17, wherein the positioning means allows one of the pair of electronic displays to be positioned at a plurality of locations on the arm assembly to permit the distance between the pair of electronic displays to be varied to thereby minimize a spacing between the pair of electronic displays.

37. The display system of claim 17, wherein:

(i) the mounting means mounts a rear portion of one display of the pair of electronic displays to the arm assembly;

(ii) the mounting means permits the one display to assume a first angular position and a second angular position, the second angular position being obtained from the first angular position by rotating the one display 90 degrees with respect to the arm assembly about a rotation axis substantially perpendicular to a screen of the one display;

(iii) the positioning means allows positioning of the rear portion at a plurality of distances from the support means to minimize a spacing between adjacent edges of the pair of electronic displays in the first angular position and in the second angular position;

(iv) the base projects horizontally from the bottom of the support means and is configured to stand on the support surface, said support surface being a horizontal surface of a desk; and (v) the arm assembly consists of directly connected components, said arm assembly projecting horizontally from the support means.

38. The display system of claim 1, wherein:

(i) the mounting means mounts a rear portion of one display of the pair of electronic displays to the arm assembly;

(ii) the positioning means allows positioning of the rear portion at a plurality of distances from the support means to minimize a spacing between adjacent edges of the pair of electronic displays in the first angular position and in the second angular position;

(iii) the base is configured to stand on a horizontal surface of a desk; and (iv) the arm assembly consists of directly connected components.

* * * * *